Nov. 24, 1959  D. M. GORDON  2,913,921
CARBURETOR THROTTLE CONTROL
Filed March 5, 1956  9 Sheets-Sheet 1

INVENTOR.
DWIGHT M. GORDON
BY Bertram H. Mann
ATTORNEY

Nov. 24, 1959  D. M. GORDON  2,913,921
CARBURETOR THROTTLE CONTROL
Filed March 5, 1956  9 Sheets-Sheet 2

INVENTOR.
DWIGHT M. GORDON
BY Bertram H. Mann
ATTORNEY

United States Patent Office 2,913,921
Patented Nov. 24, 1959

2,913,921

CARBURETOR THROTTLE CONTROL

Dwight M. Gordon, Farmington, Mich., assignor, by mesne assignments, to ACF Industries, Incorporated, New York, N.Y., a corporation of New Jersey Application March 5, 1956, Serial No. 569,496

16 Claims. (Cl. 74—472)

This invention relates to an engine speed control device primarily for motor vehicle application, which control is especially suited to supplement the action of the usual manual throttle control to accommodate the needs of an engine, an automatic transmission for driving the vehicle from the engine, and any accessory devices driven by the engine.

Several embodiments of the invention are illustrated and described, all of which may be regarded, broadly, as improvements on the invention disclosed in my co-pending application with Alfred E. Majewski, Serial No. 345,-299, filed March 30, 1953.

In this prior application, the carburetor has a suction motor provided with a diaphragm operated plunger actuated by engine suction, which is positioned to move the carburetor throttle so as to increase or decrease the engine idling speed during engine operation. The device, including the diaphragm operated plunger, is provided with a control circuit including a switch operated by the transmission control selector lever, and a switch for controlling the air conditioning system, arranged in series. When one or the other of these switches is open, the device returns the throttle to normal idling position, but when both are closed, the throttle is opened to increase the engine idling speed.

The present invention is a modification of the above structure which operates in a very similar manner to produce the same result, but, in addition, it is adapted to act as a dashpot to retard the closing action of the throttle during operation of the motor vehicle with the control selector lever in any one of the drive positions.

Such a control can have many uses, but the use contemplated is in combination with a vehicle air conditioning system. Where the compressor is driven directly from the engine, it is desirable that the vehicle be cooled as quickly as possible, and this, in turn, requires that the compressor be driven at higher engine speeds than the normal idle speed of the engine when the engine is first started. After initial cooling is performed, then engine speed can be reduced. In fact, when the vehicle is operated, transmission characteristics make this reduced engine idle speed desirable.

The present invention automatically provides these suitable engine idling speeds. According to this invention, when the transmission is in neutral and the air conditioning control is in "on" position, engine idling speed is increased to around 700 to 800 r.p.m. On the other hand, when the transmission is shifted to "drive" position, idling speed is reduced to about 400 r.p.m. whether the air conditioning system is on or not. Furthermore, during operation of the vehicle with the transmission control selector lever in any one of the drive positions, operation of the throttle in an opening direction automatically positions the device to act as a throttle retarder if the throttle is suddenly closed. This is desirable to prevent engine stalling. When the throttle is suddenly opened, and then abruptly closed, the mixture in the manifold becomes excessively rich, and engine operation at idle becomes very unstable. To avoid this, it is necessary to retard the closing action of the throttle and permit the excessive amounts of fuel in the manifold to be swept out of the engine.

In order to do this function satisfactorily, it is necessary that the dashpot control a substantial range of throttle closing movement. When this feature is combined with the idling speed control device above described, a variable stroke is incorporated into the apparatus to perform both functions satisfactorily.

Illustrated in the accompanying drawings are several forms of the invention which will perform in the manner intended:

Fig. 3 is a sectional view of the same device showing the position of the parts to provide throttle opening for fast idle, air conditioner on.

Fig. 5 is a view of the same device illustrating the position of the parts when the throttle is closed suddenly and the device acts as a throttle retarder.

Fig. 6 is a sectional view of a modification showing the position of the parts in normal idle conditions.

Fig. 7 is a similar view to Fig. 6 showing the position of the parts in the fast idle position, with the air conditioner on.

The automatic control system

Figures 1, 2:
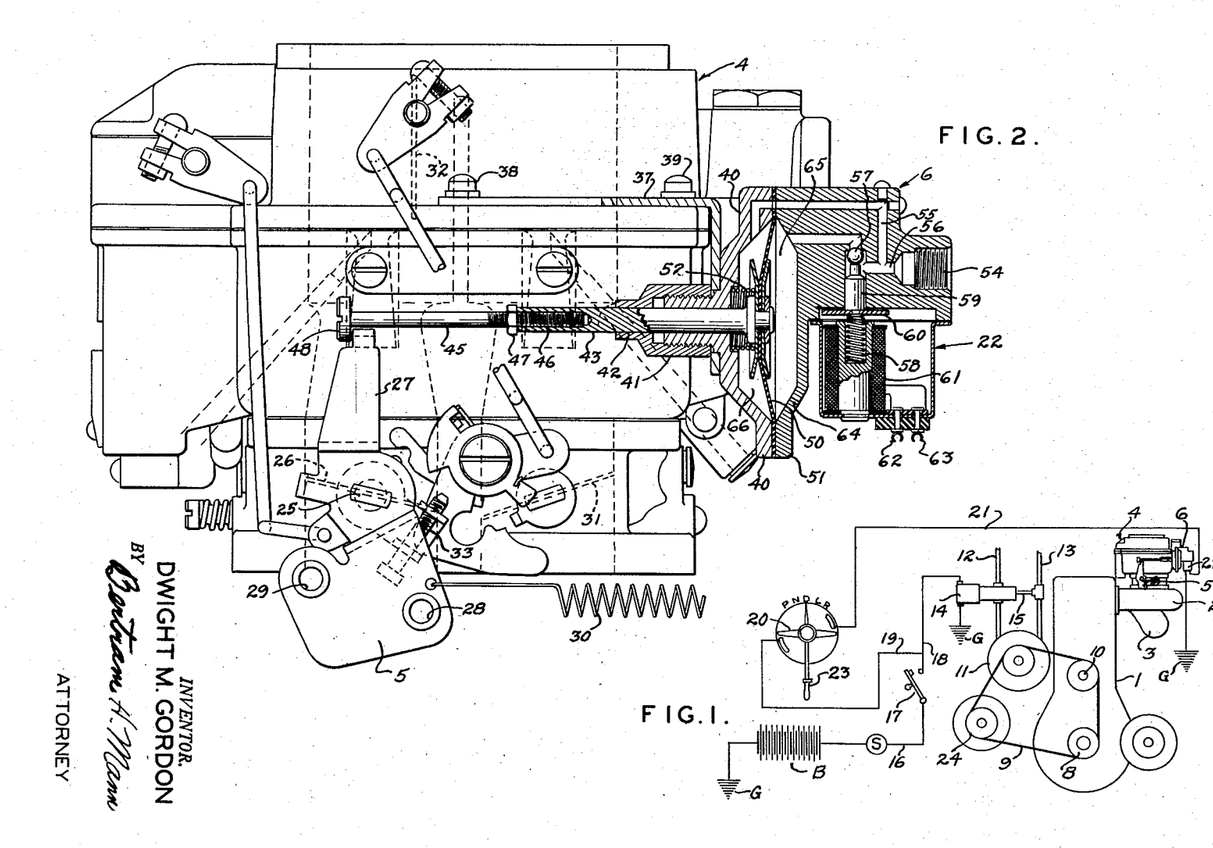
Fig. 1 is a diagrammatic view illustrating the electrical control circuit for the throttle operating device shown in detail in the following illustrations of the drawings.
Fig. 2 is a detailed view of a throttle operating device mounted on a carburetor, with the throttle of the carburetor in a normal idle position.

The automatic control system constructed according to the present invention and using a carburetor equipped with the power operated control device is diagrammatically illustrated in Fig. 1. The engine 1 drives an automatic transmission (not shown). On the engine is an exhaust manifold 3 and an intake manifold 2 mounting a carburetor generally indicated as 4. The carburetor has a manually operated throttle lever 5 with throttle control device 6 mounted on the carburetor adjacent the manually operated throttle lever 5. On one end of the engine crankshaft is a pulley 8 having a V-belt 9 which is trained over a series of like driven pulleys for operating the water pump 10, the generator 24, and the accessory device 11, which is, in this case, a refrigerant compressor for an air conditioning system for cooling the motor vehicle. Since the remainder of the refrigerating unit for the air conditioning system forms no part of the present invention, it will not be illustrated and described here. For the purpose of this invention, it is sufficient to point out that the compressor 11 is provided with an intake line 12 and an exhaust line 13, which are connected with the evaporator and the condenser of the refrigeration unit, respectively. The intake and exhaust lines 12 and 13 are interconnected by a by-pass 15 controlled by a solenoid operated valve 14. When the air conditioning system is in its "on" or normally operating condition, solenoid valve 14 is closed, preventing the circulation of refrigerant through the by-pass 15 from the exhaust line 13 to the intake 12 to the compressor 11. When the system is shut off, the solenoid valve is de-energized, opening the by-pass through line 15, and the refrigerant is merely circulated through the compressor 11, exhaust line 13, by-pass 15 to intake 12, and back to the compressor.

An electric circuit is provided from the battery B to operate the solenoid valve 14. In this circuit is a manual or thermostatically operated control switch 17 connected between leads 16 and 18 extending from the battery B to solenoid valve 14. The solenoid valve 14 is also connected to ground G. Since the battery B is also connected to ground, when the switch 17 is closed, the circuit is completed from the battery to the solenoid switch 14 for closing the by-pass line 15 to operate the compressor 11. It will be understood that when the by-pass 15 is closed, refrigerant will be compressed and forced out through exhaust line 13.

The control circuit also includes a lead 19 connected with 18 and extending through a switch 20 operated by the transmission selector 23. A lead 21 connects the switch 20 with a solenoid operated valve 22 on the device 6. Switch 20 is so constructed that it will be closed when the transmission selector lever 23 is in the neutral or parked positions indicated as N and P, which are the neutral transmission positions. When the transmission control is in the positions D, L or R, in which the transmission is conditioned for operation, the switch 20 will be open.

With the engine 1 operating and the switch 17 closed, the idling speed will be suitably adjusted for either operating of the transmission during vehicle operation or the operating of the air conditioner exclusively, in the neutral or parked positions of the transmission. Thus, when the vehicle is not in operation and the selector 23 is positioned in N or P, the electric circuit will be completed to the solenoid valve 22, causing the device 6 to position the throttle for fast idle. On the other hand, when the transmission selector 23 is moved to any one of the D, L or R positions, the circuit to the solenoid valve 22 is de-energized, so that the normal engine idling speed is provided.

The throttle control or adjusting device for varying the throttle position may take any one of several forms, such as are illustrated in the accompanying drawings. The first form for the mechanism is illustrated in Fig. 2. In this figure is shown a conventional four-barrel carburetor, such as that described in my prior Patent 2,681,213, issued June 15, 1954. The carburetor has a primary throttle shaft control lever 5 rigidly mounted on a primary throttle shaft 25 on which are primary throttle valves 26, one of which is shown. Lever 5 has an extension 27 and is apertured at 28 and 29 for attachment with the usual accelerator pedal linkage (not shown).

Throttle lever 5 carries an idle speed adjusting screw 33 for cooperation with a fast idle cam operated by the automatic choke mechanism incorporated in the carburetor. This mechanism will not be described in detail because it forms no part of the instant invention.

The throttles 26 are held in closed position by a spring 30 and are opened by operation of the usual accelerating pedal located in the motor vehicle.

The carburetor also includes a pair of secondary stage barrels which are controlled, in turn, by secondary throttles 31, one of which is shown. The secondary throttles are held out of operation until the choke valve is fully opened by the automatic choke mechanism, and, since specific carburetor structure is of no concern here, the mechanism will not be specifically described. The choke valve 32 and the secondary throttles and mechanism for operation thereof are all as described in my prior mentioned patent.

The throttle control device 6 is supported on the carburetor by a bracket 37, secured in any suitable manner, such as by screws 38 and 39. Bracket 37 is suitably secured to one half of the diaphragm casing 40 by a threaded nut 41 formed with a plunger guide bearing 42 slidably receiving the plunger 43. The end of the plunger is threaded to receive a bolt 45 adjustably secured in screw threads 46 and held by a lock nut 47. Head 48 on the end of the bolt 45 is adjusted so that there will be a slight clearance in the normal idle condition of the throttle 26 between the lever 27 and the inner side of the head 48.

Plunger 43 has an operating diaphragm 50 mounted between the opposing flanges on the diaphragm casings 40 and 51. A spring 52 is interposed between the end of the plunger 43 and the casing 40. This spring is selected so that, when compressed, it is sufficiently powerful to overcome the tension of the spring 30, so that its action in a throttle opening direction can overcome the action of the spring 30 in the closing direction.

The throttle control device 6 has a connection 54 for a line leading to the intake manifold 2 of the engine 1, so that suction in the manifold is communicated to the throttle control device 6. Extending from connection 54 are a pair of passages 55 and 56 which lead to opposite sides of the diaphragm 50. Passage 56 is controlled by a ball check valve 57 held closed by a spring 58, acting upwardly on a plunger 59. The lower end of the plunger carries an armature 60 positioned adjacent a solenoid 61 provided with the electrical connections 62 and 63. These, in turn, connect with the ground and the lead 21, respectively, so that, when the solenoid is energized, spring 58 is compressed and the ball valve 57 allowed to drop from its seat. Casing 51 also contains a metered bleed opening 64 which communicates directly with atmosphere.

*Operation*

Taking the condition, first, where either one or both of the switches 17 and 20 are open, the circuit from the battery to the throttle control device and its solenoid 61 will be de-energized, all as illustrated in Fig. 1. When de-energized, suction in chamber 66 holds spring 52 compressed so that throttles 26 can return to normal idle position. When de-energized, spring 58 will expand, seating ball check valve 57, and substantially atmospheric pressure will exist in the chamber 65 on one side of the diaphragm 50. Since the opposite chamber 66 is always subject to manifold pressure through the connection 54, the spring 52 will be compressed by movement of the plunger 43 to the left into an extreme displaced position. Clearance will then exist between the underside of the head 48 and the lug on the lever 27, so that throttles 26 may be returned by the spring 30 to a substantially closed position corresponding with that permitting a normal idling speed operation of the engine 1.

Referring again to Fig. 1, if both switches 20 and 17 are closed, then solenoid 61 will be connected with the battery, opening the check valve 57 and placing the chamber 65 in communication with suction through the connection 54. The condition of the parts in the throttle control device 6 is then that shown in Fig. 3. As the pressure drops in the chamber 65, due to the opening of the valve 57, spring 52 will expand, overcoming the resistance of spring 30 and moving the throttles 26 to a position to increase the engine idling speed. Because of the bleed 64, the pressure in the chamber 65 never drops as low as the pressure in the chamber 66. Consequently, the spring 52 will expand to move the plunger 43 until there is an equilibrium of forces acting. Of course, this spring 52 must overcome the resistance of the spring 30, and it will be apparent that, as the spring 52 expands, its power becomes less, while, as the spring 30 stretches, its power becomes greater. Likewise, spring 52 must also overcome the difference in pressure existing between the chambers 65 and 66. This difference, in turn, will depend upon the degree of suction in the intake manifold with respect to the size of the bleed 64. Of course, the degree of suction in the intake manifold 2 will increase with increasing engine idling speeds, so that the action of the control device 6 depends to a great extent on engine idling speed. The size of the bleed hole 64 is so calibrated that, under normal engine operating conditions, the throttles 26 will be opened to the proper amount to give the desired fast idling speed. Usually, the degree of opening of the throttles 26 will correspond to approximately the medial position of the diaphragm, so that the chambers 65 and 66 are substantially equal.

Figures 3, 5:
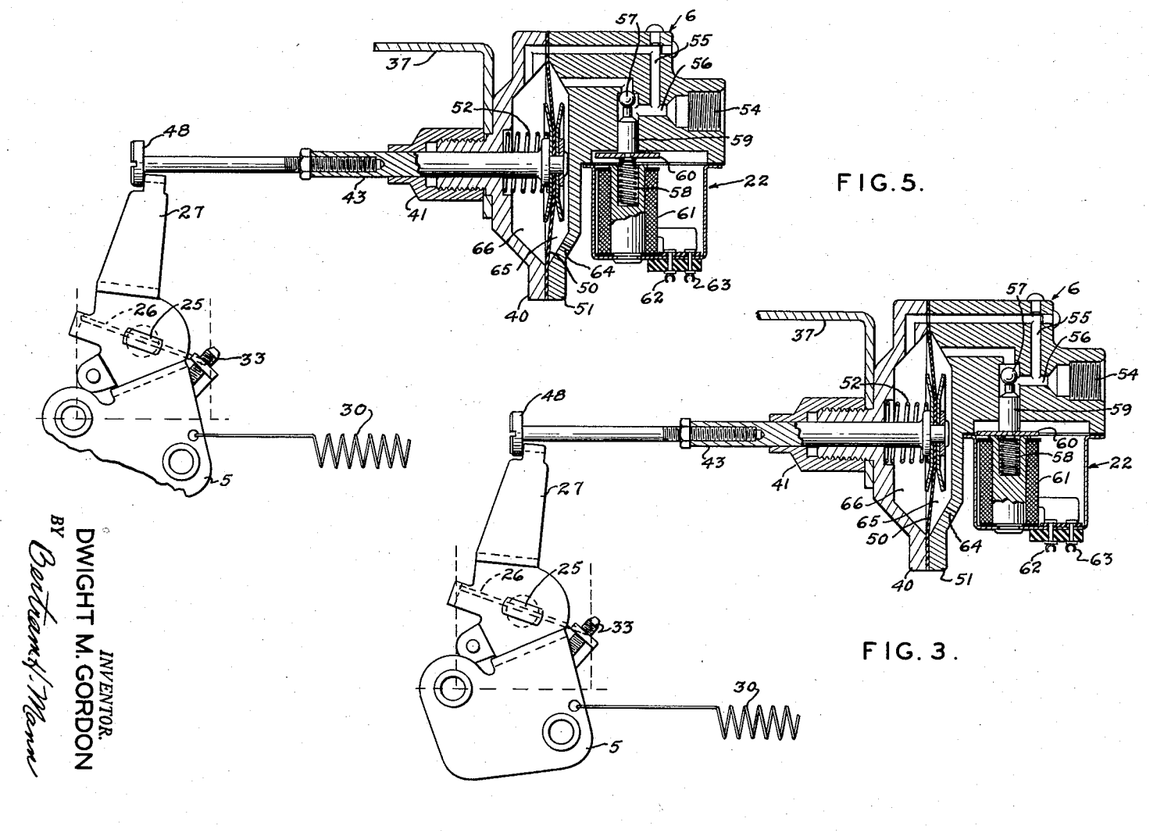
Figures 4, 8:
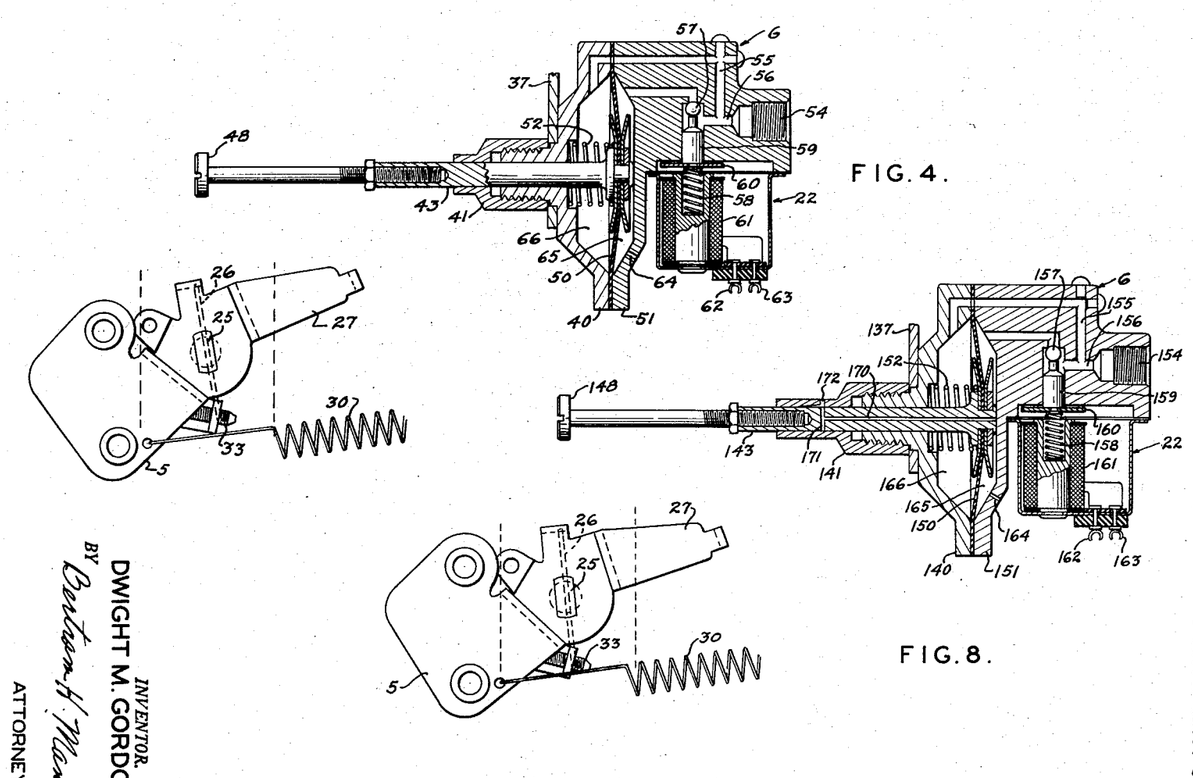
Fig. 4 is a similar view of the same parts illustrating their relative positions when the throttle is opened manually with the transmission control in "drive" position.
Fig. 8 is a similar view of the parts illustrating their relative position when the throttle is opened suddenly with the transmission control in one of the drive positions.

Figs. 4 and 5 illustrate the action of the device as a throttle retarder. During operation of the motor vehicle, the control selector lever 23 will be in one of the "drive" positions, opening the circuit to the solenoid 61 and allowing the valve 57 to close. With this condition of the parts, if the throttles 26 are suddenly opened, suction in the manifold 2 will drop to practically zero. Spring 52 is then freed from the resistance of spring 30 and, likewise, is freed from the effects of suction in the chamber 66, for, as suction in the manifold decreases to zero, the difference in pressure between the chambers 65 and 66 decreases, and spring 52 can expand fully, moving the plunger 43 all the way to the extreme end of its possible displacement, as illustrated in Fig. 4. If pressure on the accelerator is suddenly released, abrupt full closing of the throttles 26 will be prevented by early engagement of the lever 27 with the head 48, as illustrated in Fig. 5. The rate of closing of the throttles 26 from this point on will depend upon the size of the metered bleed hole 64. This position of the parts is indicated in Fig. 5. Suction in the chamber 66 will increase rapidly to maximum, but, at the same time, resistance to movement of the diaphragm will be opposed by a similar suction in the chamber 65 created by expansion and the flow restriction of bleed 64, so that the rate of throttle closing will depend upon three opposing forces—the resistance of the spring 52, the degree of suction in the chamber 66, and the rate of bleed-down of suction in the chamber 65, whereby final closing movement of the throttles 28 will be retarded by the throttle control device acting as a dashpot, and over a stroke much longer than that necessary for a fast idle position such as illustrated in Fig. 3. The dual function of the control device 6 is accomplished by the manner of its interconnection with the force of suction in the intake manifold and by its novel reaction to variations in the force of suction, giving a dual range of action in the normal operation.

First modification

In Figs. 6 to 9, inclusive, is shown a modification of the device above described. The same or identical parts in the two devices have been given the same reference characters with the addition of 100. A detailed description of the parts and how they are interconnected does not appear necessary in view of the detailed description of the first embodiment above. Therefore, this discription will be limited to those differences which distinguish the two devices.

Figures 6, 7:
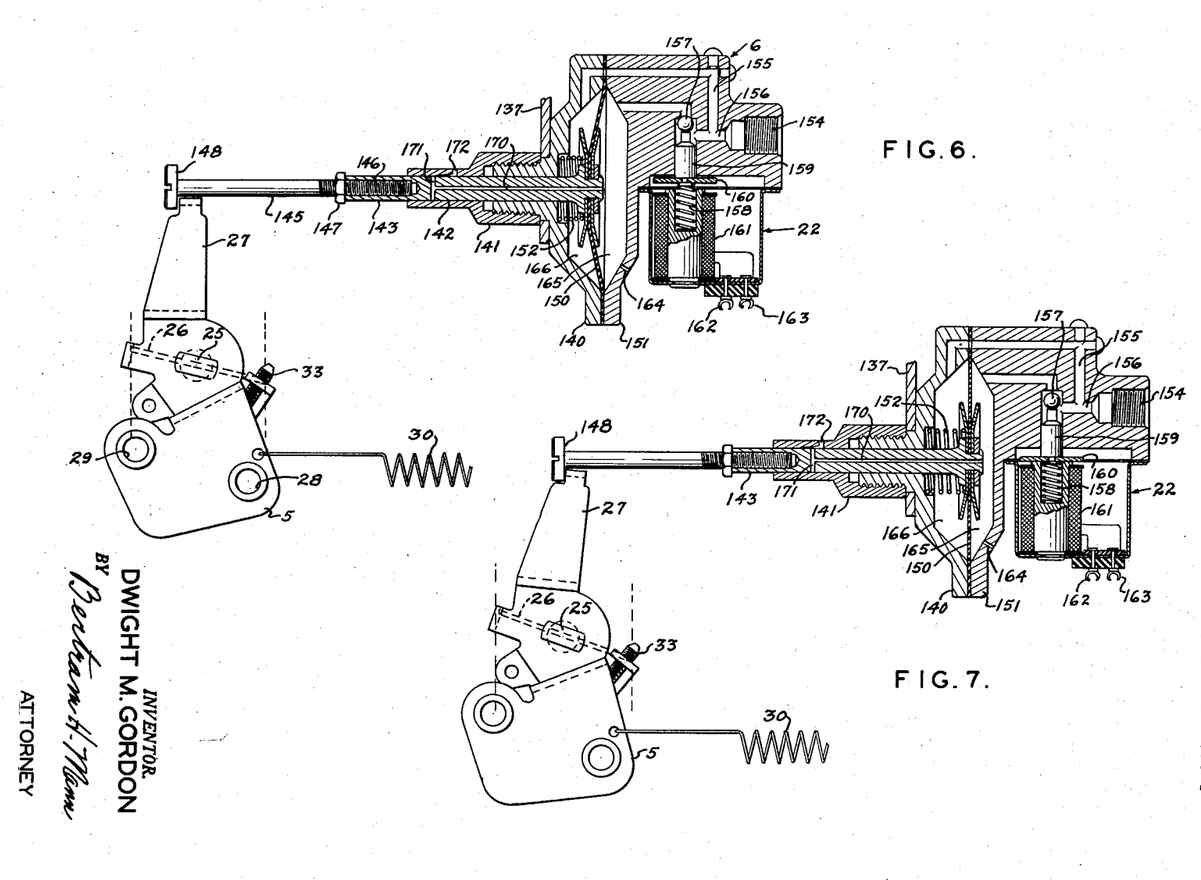

The embodiment shown in Figs. 6 to 9 contains an additional feature which aids in stabilizing the device of the prior modification in Figs. 2 to 5, so that a better and more uniform action may be obtained in the fast idle position above described. With reference to Fig. 6, it will be noted that the plunger 143 has a central bore 170 extending from chamber 165 on the right of the diaphragm to a transverse circumferential groove 171. This groove is positioned to register with a tapered, metered slot 172 in the bearing guide 142 of the nut 141. This bleed will supplement the action of the bleed 164 in the chamber 165 during the operation of the device for producing the fast idle.

Operation of first modification

In Fig. 6, the control device 6 is shown with the parts positioned to give the normal idle setting for the throttle 26. In this throttle setting the head 148 has some clearance with the arm 27 of the throttle, which normally eliminates interference with its return to the dead-idle position. Thus, when either switch 17 or 20 is open, the throttles 26 can return to the dead-idle position.

When both switches are closed, however, suction is transmitted from the connection 154 to both chambers 165 and 166. The pressure in chamber 165, however, will always be somewhat higher than that in the chamber 166, due to the bleed 164. Nevertheless, the load on the spring 152 is decreased, and the spring expands, moving the plunger to the right, so that the circumferential groove 171 registers with tapered groove 172. Thus, this movement to the right has the effect of increasing the bleed opening into the chamber 165, decreasing the suction therein, so that the spring meets an ever increasing resistance as the plunger moves to the right. The movement of the plunger reaches a stationary point when the forces that are acting come into balance—that is, when the difference in pressure acting on the diaphragm 150 and the tension of the spring 30 equal the throttle opening movement of the spring 152.

The action of the embodiment shown in Figs. 6 to 9 as a throttle retarder is substantially the same as that described above for the first embodiment in Figs. 2 to 5, inclusive. When solenoid 161 is de-energized by placing the control selector lever 23 in any of the "drive" positions, then quick or sudden opening of the throttles 26 decreases the manifold pressure so that substantially identical pressures exist in the chambers 165 and 166, and the plunger 143 moves to the right into the position shown in Fig. 8. It will be noted that this amount of displacement exceeds that of Fig. 7.

Figures 9, 11:
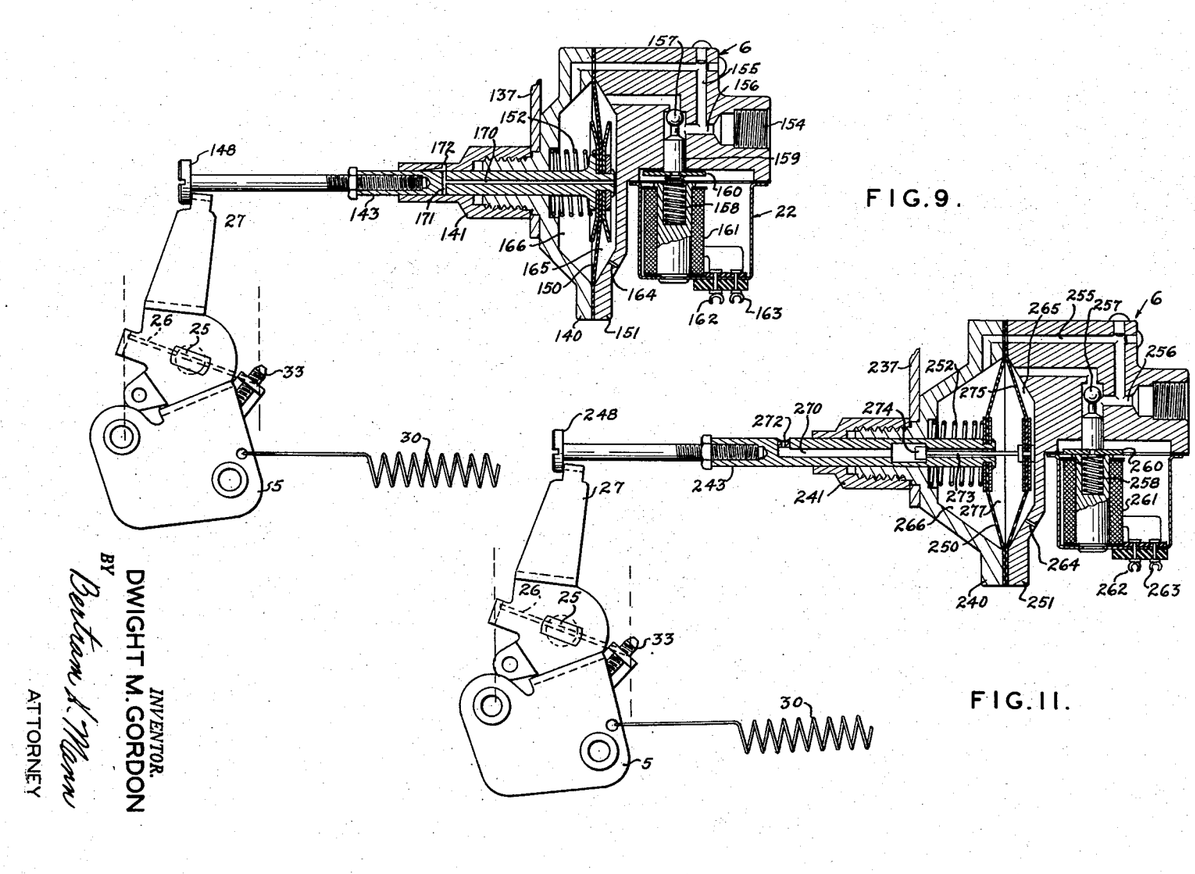
Fig. 9 is a view of the same modification illustrating the position of the parts at the beginning of the throttle retarding action.
Fig. 11 is a similar view of the same construction showing the position of the parts for fast idling engine speeds.

Abrupt closing of the throttle brings the lever 27 into engagement with the head 148, as shown in Fig. 9. This is the beginning of the throttle retarding action by the control device 6. Abrupt closing of the throttles will increase the suction and increase the difference in pressure existing on the opposite sides of the diaphragm 150, acting in opposition to the spring 152. This action will gradually compress the spring 152 at a rate permitted by the bleeding off of the suction created by the movement of the diaphragm to the left through the atmospheric bleeds 164 and 172. The retarding effect of the control device 6 will increase with throttle closing movement, due to the taper of the groove 172, so that the throttle will gradually return to the dead-idle position. This allows time for the vapors and over-rich mixture in the manifold to be eliminated by the pumping action of the engine itself, and a stable idle is thereby obtained.

Description of second modification

A second modification of the invention is shown in Figs. 10 to 13, inclusive. The same parts as shown in the prior embodiments are given the same reference characters with the prefix 200. Since the arrangement of the parts has already been described, this description will be confined to the differences in this modification over the two previous modifications.

Figures 10, 12:
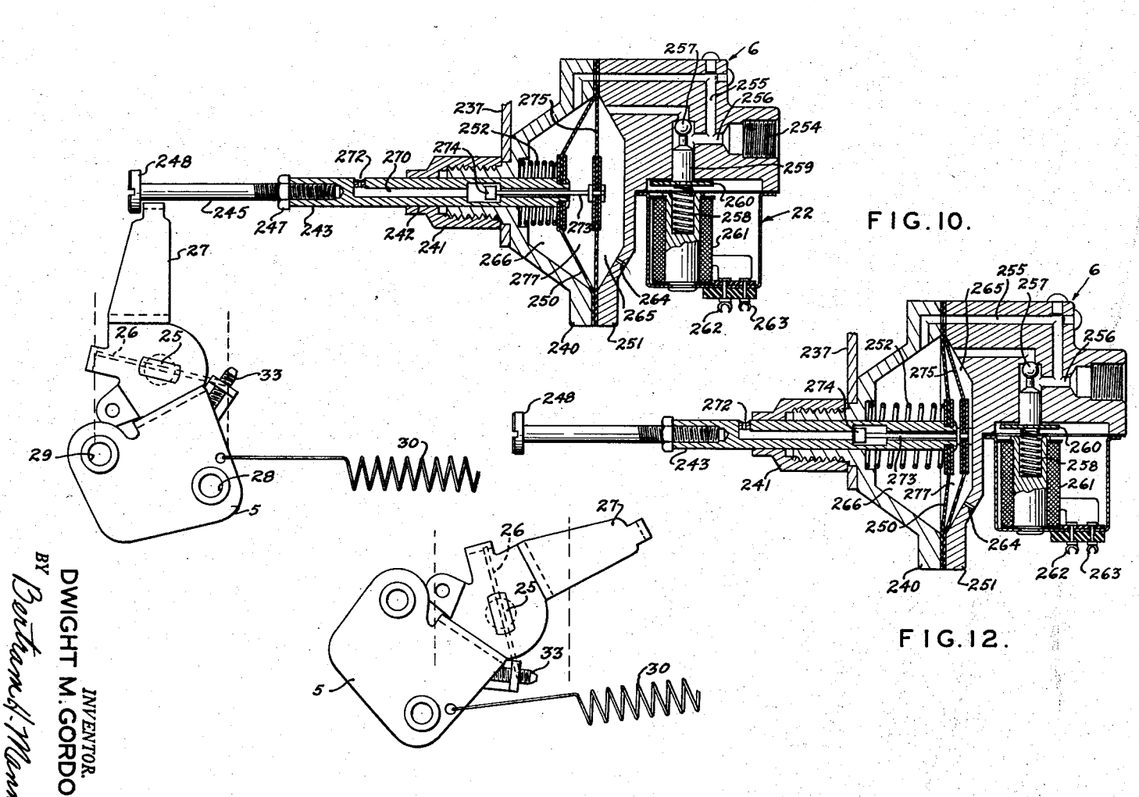
Fig. 10 is a view in section of another modification showing the position of the parts at normal idle engine speeds.
Fig. 12 is a similar view of the same device showing the position of the parts when the throttle is suddenly opened.

As shown in Fig. 10, the plunger 243 is provided with a central bore 270 which leads to the righthand side of diaphragm 250, and connects with an atmospheric bleed 272. Within a cavity in the bore 270 is located a stem 273 connected with a diaphragm 275, secured between the casing parts 240 and 251 in abutting relation with the diaphragm 250. The opposite end of the stem 273 is provided with a stop member 274. This is not a valve, and is not intended to operate to close the passage 270 at any time.

The diaphragms 250 and 275 divide the chamber within the casing into three parts, 266, 277 and 265. The chamber 265 has the usual air atmospheric bleed 264, and chamber 277 likewise is provided with the bleed 272.

*Operation of second modification*

When the battery circuit to the solenoid 22 is open, the position of the throttle and the related parts of the control device are illustrated in Fig. 10. The valve 257 is closed and suction is communicated to chamber 266 by way of the passage 255. Atmospheric pressure, or substantially atmospheric pressure, will exist in chambers 277 and 265. Under these pressure conditions, diaphragm 250 will be biased to the left, compressing spring 252, and spring 30 will return the throttles 26 to the dead idle position whenever the accelerator pressure is released from the accelerator pedal.

When the battery circuit to the solenoid 22 is energized, the condition of the separate parts of the device is illustrated in Fig. 11. Energization of the circuit opens the valve 257, communicating suction to the chamber 265, as well as to the chamber 266. Since atmospheric pressure exists in the chamber 277, due to the continually open bleed 272, the diaphragms 250 and 275 tend to separate, engaging the stop 274 with one wall of the recess within the bore 270. The force exerted by the diaphragm 275 through engagement of the stop 274 will neutralize the force exerted on the diaphragm 250 by suction in the chamber 266, so that both diaphragms not only separate but move bodily to the right under influence of the force from spring 252, as shown in Fig. 11. This movement will continue until stem 273 engages the casing and further movement to the right of the plunger 243 is arrested. Stated another way, the length of the stem 273 fixes the length of stroke of the plunger 243 for opening the throttles 26 to the fast idle position.

Figure 13:
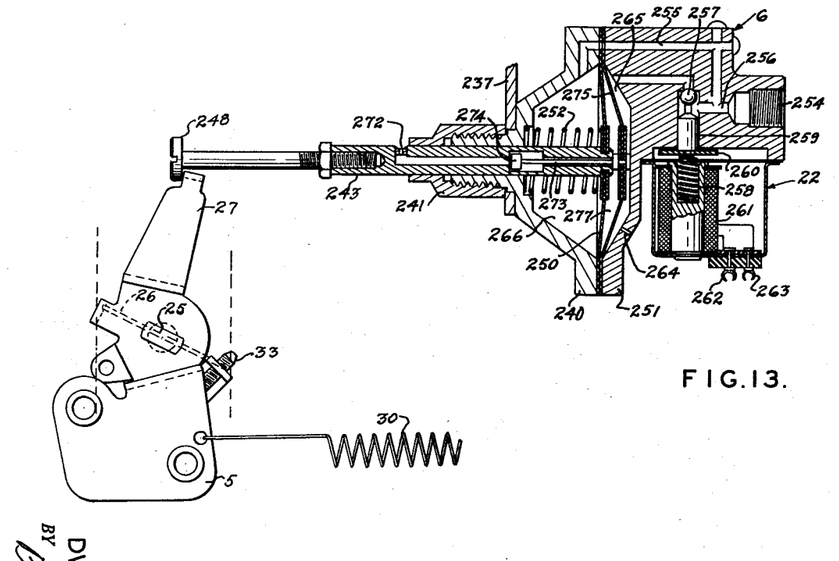
Fig. 13 is a similar view of the same modification showing the position of the parts at the beginning of the throttle retarding action.

The action of this modifications as a throttle retarder is similar to that above explained, and is illustrated in Figs. 12 and 13. When the circuit to the solenoid 22 is de-energized and the throttle 28 suddenly opened manually, suction will decrease in the manifold, permitting the spring 252 to expand and move both diaphragms fully to the right, thereby collapsing the chambers 277 and 265. Now, if pressure on the accelerator pedal is abruptly released, the throttle will close to the position shown in Fig. 13, in which lever 27 engages behind the head 248. Further closing movement of the throttle must overcome the resistance of the spring 252, although it may be aided during this first phase of closing movement by the build-up of suction within the chamber 266. However, once the closing movement has reached the point where stop 274 engages with the shoulder within the plunger 243, the resistance of the plunger to closing depends upon the bleed-down of suction in the chamber 265 through the vent port 264, so that the closing movement of the throttle is slower within this second phase of movement. This action will give enough time for the engine to clear the manifold of the over-rich mixture, due to the sudden throttle opening.

*Description of third modification*

A third modification of the invention is illustrated in Figs. 14 through 17, inclusive. In this modification, the same parts have been given the same reference characters with the prefix 300. A detail description does not appear necessary, since the parts are arranged in a manner already described above. This description will be confined to the differences between this modification and the preceding one.

Figures 14, 15:
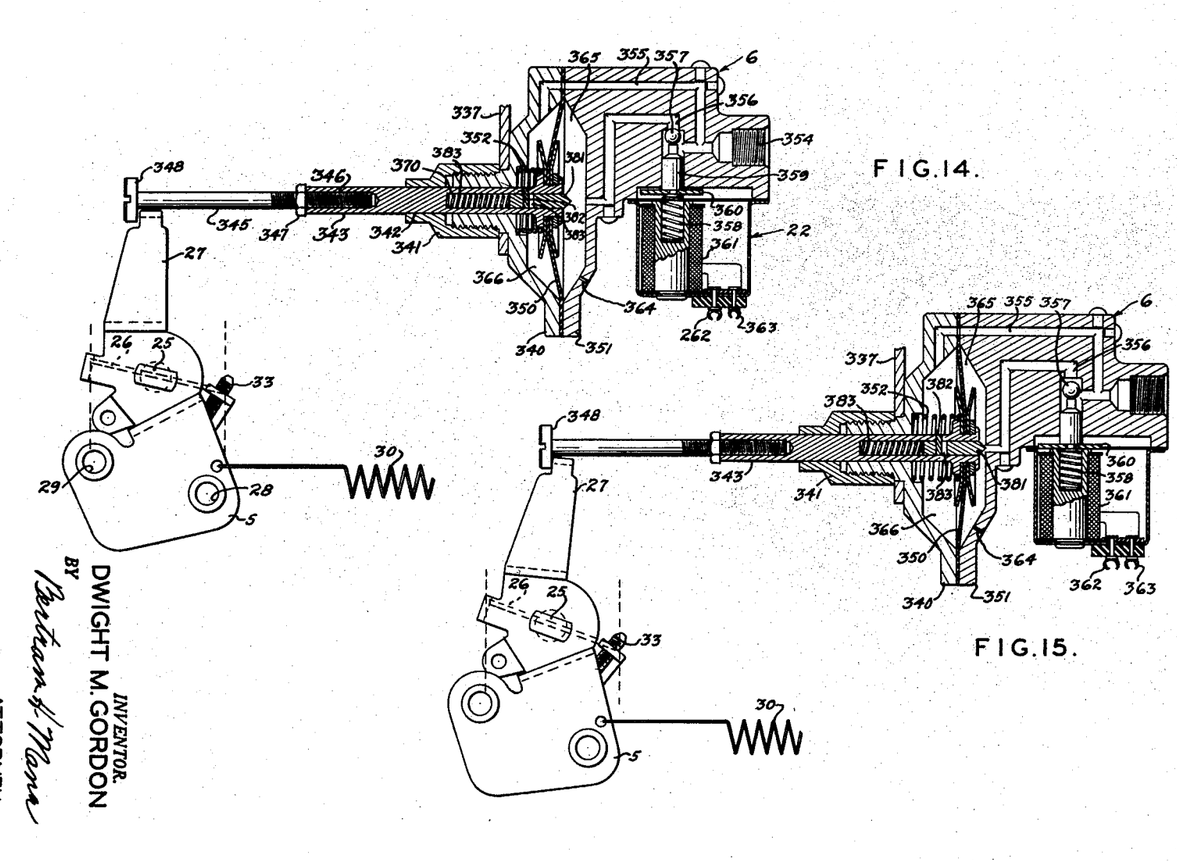
Fig. 14 is a sectional view of a modification showing the position of the parts in this modification at normal engine idling speeds.
Fig. 15 is a similar view of the same modification showing the position of the parts at fast idling speeds.

Within the bore 370 in plunger 343 is a needle valve 381 slotted at 383 to receive a pin 382 providing for limited lost motion of the needle valve 381 within the bore 370. A spring 383 urges the needle valve in a direction to the right with respect to the plunger 343. Furthermore, according to this modification, the termination of the passage 356 in the chamber 365 is located in alignment with the end of the needle valve 381. This ararngement of the parts provides for an operation very similar to those above described.

*Operation of third modification*

When the circuit to the solenoid 22 is de-energized, the position of the parts within the control device is as illustrated in Fig. 14. In this position, clearance is provided between the head 348 and the lug on the arm 27 so that the throttle 26 can return to the dead-idle position. Suction acting on the left of the diaphragm 350 in the chamber 366, and atmospheric pressure in the chamber 365, compresses the spring 352 and permits the spring 30 to return the throttles to the dead-idle position.

With the circuit from the battery to the solenoid 22 closed, valve 357 will be opened, so that suction is communicated to both chambers 336 and 365. Thus, the pressures in the chambers 366 and 365 will be substantially equal, lessening the resistance to expansion of spring 352. The spring is then strong enough to overcome the resistance of the spring 30 and move the arm 27 so as to open the throtles to the fast idle position of the engine 1. As the spring 352 expands, however, the end of spring-pressed needle valve 381 closes the open end from passage 356, limiting the amount of movements of the diaphragm to the right. The throttling of the passage 356 by the needle valve causes the pressure on the righthand side of the diaphragm in chamber 365 to increase and, eventually, a stabilized position will be found, such as that illustrated in Fig. 15 wherein the needle valve almost closes the passage 356. This equilibrium is due to the fact that the atmospheric bleed 364 is always open, and so the pressure in the chamber 365 will increase as the entrance of the passage 356 is throttled by the needle valve 381.

Figures 16, 17:
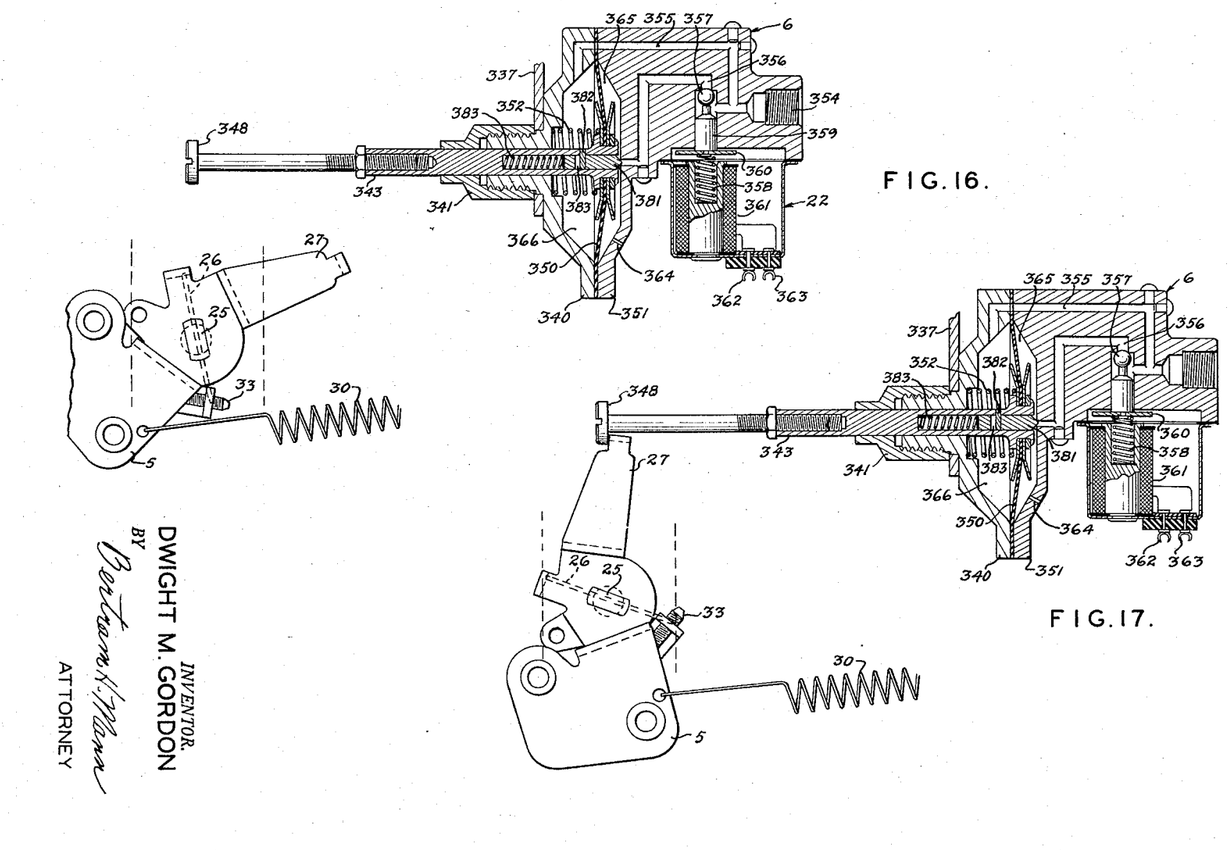
Fig. 16 is a similar view of the same modification showing the position of the parts when the throttle is suddenly opened.
Fig. 17 is a similar view of the same modification showing the parts at the beginning of the throttle retarding action.

When the circuit to the solenoid 22 is de-energized by placing the control selector lever in one of the "drive" positions, and the throttle is suddenly opened as illustrated in Fig. 16, pressures in the chambers 265 and 266 will become substantially equal, or at least the difference in pressure will so decrease between them that spring 352 can expand fully and move the plunger 343 to the right. Because the needle valve 381 is spring mounted, it will have no limiting effect on the righthand movement until engaged by the pin 382, as shown in Fig. 16. In other words, the closing of the passage 356 has nothing to do with the length of stroke. The needle valve mounting permits lengthening the stroke to any degree desired.

Now, if the pressure is abruptly released from the accelerator pedal, spring 30 will return the throttles toward closed position until the lever 27 abuts the head 348. From this point on, the throttle closing movement is subject to the retarding action imposed by the spring 352 and by the bleeddown of suction in the chamber 365 through the port 364. This will give adequate time for the engine to clear the intake manifold of an over-rich mixture and avoid engine stalling for that reason.

A structure has been described which will carry out all of the objects of the invention, but it is contemplated that other modifications will appear to those skilled in the art which come within the scope of the appended claims.

I claim:

1. In a motor vehicle, an engine, an automatic transmission driven from the engine, a carburetor having a throttle, control means for varying the idling speed of the engine comprising a transmission control lever, a suction motor having a connection with said throttle, a pair of oppositely acting expansible chambers in said motor, passages connecting said chambers individually with a source of suction posterior of said throttle, a spring for said motor acting in a throttle-opening direction to increase the size of one of said chambers and to decrease the size of the other of said chambers, valve means operable by said control means responsive to movement of said lever to communicate the force of suction in said passages to one of said chambers, means cooperating with said valve means and operating to unbalance the pressures in said chambers by varying degrees to fully or partially compress said spring to provide a range of throttle movement between a normal idle and a fast idle position of said throttle and assisting said spring action to retard throttle closing through a greater range of throttle movement after said throttle has been opened.

2. In a motor vehicle, an engine, an automatic transmission driven from the engine, a carburetor having a throttle, a spring normally tending to close said throttle, control means for varying the idling speed of the engine comprising a transmission control lever, a suction motor connected to operate said throttle, a pair of oppositely acting expansible chambers in said motor, passages connecting said chambers individually with a source of suction posterior of said throttle, a spring for said motor acting in a throttle opening direction to increase the size of one of said chambers and to decrease the size of the other of said chambers, means including a valve operable by said control means responsive to movement of said lever to unbalance the pressures in said chambers by varying degrees to fully or partially compress said last named spring to provide a range of throttle movement between a normal idle and a fast idle position of said throttle, and means cooperating with said valve for retarding throttle closing through a greater range of throttle movement after said throttle is opened.

3. In a motor vehicle, an engine, an automatic transmission driven from the engine, a carburetor having a throttle, control means for varying the idling speed of the engine comprising a transmission control lever, a suction motor having a one-way connection with said throttle, a pair of oppositely acting expansible chambers in said motor, passages connecting said chambers individually with a source of suction posterior of said throttle, a spring for said motor acting in a throttle opening direction to increase the size of one of said chambers and to decrease the size of the other of said chambers, means including a valve operable by said control means responsive to movement of said lever to unbalance the pressures in said chambers by varying degrees to fully or partially compress said spring to provide a range of throttle movement between a normal idle and a fast idle position of said throttle, and means cooperating with said valve and assisting said spring action to retard throttle closing through a greater range of throttle movement.

4. The combination defined in claim 3 wherein said means cooperating with said valve includes an atmospheric bleed passage in one of said chambers.

5. The combination defined in claim 3 wherein said means cooperating with said valve includes an atmospheric bleed passage in one of said chambers, and means responsive to motor operation for variably throttling the air flow into one of said chambers.

6. In a motor vehicle, an engine, an automatic transmission driven from the engine, a carburetor having a throttle, control means for varying the idling speed of the engine comprising a transmission control lever, a suction motor having a one-way connection with said throttle, a pair of oppositely acting expansible chambers in said motor, a first movable wall in said motor rigidly secured to said one-way connection, a second movable wall in said motor having a lost motion connection with said one-way connection, passages connecting said chambers individually with a source of suction posterior of said throttle, a spring for said motor acting in a throttle opening direction to increase the size of one of said chambers and to decrease the size of the other of said chambers, means including a valve operable by said control means responsive to movement of said lever for unbalancing the pressures in said chambers to decrease the size of one of said chambers and fully compress said spring or to fully collapse the other of said chambers to provide a range of throttle movement between a normal idle and a fast idle position through said connections, and means cooperating with said valve and assisting said spring action to retard throttle closing through a greater range of throttle movement after said throttle is manually opened.

7. The combination defined in claim 6 wherein said means cooperating with said valve includes an atmospheric bleed passage in one of said chambers which is throttled by operation of said motor to compress said motor spring.

8. The combination of an engine having an induction system including a carburetor, a manually operated throttle in said carburetor, a spring for returning said throttle to normal idle position, an automatic transmission driven from the engine, control means for varying the idling speed of the engine comprising a transmission control lever, a suction motor with opposing expansible chambers, a connection between said motor chambers and said induction system posterior of said throttle, a spring for said device acting in a throttle opening direction with a degree of force sufficient to hold said throttle partly open against the force of said return spring when the differential pressure between said chambers decreases, means including a valve operable by said control means responsive to movement of said lever for closing the connection of one of said chambers with said induction system to increase the pressure differential between said chambers to unbalance the forces exerted by said motor on said spring to fully compress said spring and permit said throttle to return to normal idle, and means for regulating the return rate of said motor by controlling the degree of force exerted by said motor to compress said spring after spring expansion in response to decrease in pressure differential when the throttle is opened.

9. The combination of an engine having an induction system including a carburetor, a manually operated throttle in said carburetor, a spring for returning said throttle to normal idle position, an automatic transmission driven from the engine, control means for varying the idling speed of the engine comprising a transmission control lever, a suction motor with opposing expansible chambers, a connection between said motor chambers and said induction system posterior of said throttle, a spring for said device acting in a throttle opening direction with a degree of force sufficient to hold said throttle partly open against the force of said return spring when the differential pressure between said chambers decreases, a first valve means responsive to operation of said motor to regulate the decrease in differential pressure between said chambers, a second means including a valve operable by said control means responsive to movement of said lever for closing the connection of one of said chambers with said induction system to increase the differential pressure between said chambers to unbalance the forces exerted by said motor on said spring to fully compress said spring and permit said throttle to return to normal idle, and means for regulating the degree of spring compression force applied to said throttle when said valve is closed to retard the closing movement of said throttle after said throttle is opened manually.

10. The combination of an engine having an induction system including a carburetor, a manually operated throttle in said carburetor, a spring for returning said throttle to normal idle position, an automatic transmission driven from the engine, control means for varying the idling speed of the engine comprising a transmission control lever, a motor, a connection between said motor and said throttle, a source of power for energizing said motor to operate said throttle in one direction, a spring for operating said motor and acting in a throttle opening direction with a degree of force sufficient to hold said throttle partly open against the force of said return spring when said motor is operating at reduced power, means to increase the force exerted by said motor against said spring to fully compress said spring and permit said throttle to return to normal idle, and means for regulating the degree of compression force applied by said motor to said spring to retard the closing movement of said throttle after said throttle is opened manually.

11. In a motor vehicle, an engine, an automatic transmission driven by said engine, a carburetor having a throttle, a spring for closing said throttle, control means for varying the idling speed of the engine comprising a transmission control lever, a suction motor having a one-way connection with said throttle, a pair of oppositely acting expansible chambers in said motor, passages connecting said chambers individually with a source of suction posterior of said throttle, a spring for said motor acting in a throttle opening direction to increase the size of one of said chambers, and to decrease the size of the other of said chambers, valve means operable by said control means responsive to movement of said lever in one of said passages for applying suction to one of said chambers to fully compress said spring for normal idle position of said throttle or to open said passage to equalize the pressure in both said chambers, means for controlling the degree of suction applied to one of said chambers to unbalance the pressures between said chambers by varying degrees to allow partial expansion of said spring from a normal idle position to a fast idle position of said throttle, and means cooperating with said last-named means and assisting said spring action to retard throttle closing through a greater range of throttle movement after said throttle is opened.

12. In a motor vehicle, an engine, an automatic transmission driven by said engine, a carburetor having a throttle, a spring for closing said throttle, control means for varying the idling speed of the engine comprising a transmission control lever, a suction motor having a one-way connection with said throttle, a pair of oppositely acting expansible chambers in said motor, passages connecting said chambers individually with a source of suction posterior of said throttle, a spring for said motor acting in a throttle opening direction to increase the size of one of said chambers, and to decrease the size of the other of said chambers, means operable by said control means responsive to movement of said lever operating to balance or unbalance the pressures supplied to said chambers, and a motor controlled atmospheric bleed for one of said chambers for varying the degree of unbalance between the pressures in said chambers to fully compress said spring when said means is closed to provide a normal idle position of said throttle, or partially compress said spring when said means is open to provide a fast idle position of said throttle.

13. In a motor vehicle, an engine, an automatic transmission driven by said engine, a carburetor having a throttle, a spring for closing said throttle, control means for varying the idling speed of the engine comprising a transmission control lever, a suction motor having a one-way connection with said throttle, a pair of oppositely acting expansible chambers in said motor, passages connecting said chambers individually with a source of suction posterior of said throttle, a spring for said motor acting in a throttle opening direction to increase the size of one of said chambers, and to decrease the size of the other of said chambers, means operable by said control means responsive to movement of said lever between said source of suction and said motor operating to unbalance the pressures in said chambers to fully compress said spring to provide a range of throttle movement to normal idle position and movable to an open position to communicate suction to both said chambers, an atmospheric bleed for one of said chambers operating in response to action of said motor to vary the degree of suction in one of said chambers to partially compress said spring and limit motor movement to an intermediate position for fast idle throttle opening, and a second atmospheric bleed cooperating with said means and said first bleed and assisting said spring action to retard throttle closing through a greater range of throttle movement after said throttle has been opened.

14. In a motor vehicle having an engine, a transmission and a pump driven from the engine, and interconnected controls for operating said transmission and said pump, the combination of a throttle for said engine adapted for manual operation, and an independent throttle actuator connected with said controls including means operated in response to operation of said pump by said pump control to move said throttle actuator in one range of positions, and means in said actuator responsive to operation of said transmission by said transmission control to move said throttle actuator through a greater range of positions as said throttle is manually opened.

15. In a motor vehicle having an engine, a transmission and a pump driven from the engine, and interconnected controls for operating said engine and said pump, the combination of an engine throttle adapted for manual operation, and an independent throttle actuator connected with said controls including means operated in response to operation of said pump by said pump control to move said throttle actuator in one range of positions, and means in said actuator responsive to operation of said transmission by said transmission control to move said throttle actuator through a greater range of positions when said throttle is manually opened, and a bleed in said actuator for controlling the rate of throttle closing.

16. In a motor vehicle, an engine, an automatic transmission driven by said engine, a carburetor having a throttle, a spring for closing said throttle, control means for varying the idling speed of the engine comprising a transmission control lever, a suction motor, a pair of oppositely acting expansible chambers in said motor, said chambers being partitioned by a movable wall, said movable wall having a one-way connection with said throttle, passages connecting said chambers individually with a source of suction posterior to said throttle, a spring for said motor acting in a throttle opening direction to increase the size of one of said chambers and to decrease the size of the other of said chambers, valve means operable by said control means responsive to movement of said lever for closing or opening one of said passages, whereby suction may be available to both of said chambers or to only a single chamber, a calibrated bleed port for the chamber controlled by said valve, said bleed port cooperating with said valve means when the latter is in closed position to unbalance the pressure in said chamber by varying degrees to cause the partial compression of said spring to provide a range of throttle movement to normal idle position and said bleed port cooperating with said valve means when the latter is in open position to permit said motor spring to cause the movable wall to operate the one-way connection with the throttle to position the latter to fast idle position.

References Cited in the file of this patent

UNITED STATES PATENTS

| | | |
|---|---|---|
| 2,005,262 | Liverance | June 18, 1935 |
| 2,055,539 | Jacoby et al. | Sept. 29, 1936 |
| 2,101,605 | Winfield | Dec. 7, 1937 |
| 2,709,376 | Manchester | May 31, 1955 |
| 2,740,305 | Walden | Apr. 3, 1956 |
| 2,762,235 | Olson et al. | Sept. 11, 1956 |